(12) United States Patent
Kapaan et al.

(10) Patent No.: US 6,315,457 B1
(45) Date of Patent: Nov. 13, 2001

(54) BEARING ASSEMBLY FOR A VEHICLE HUB

(75) Inventors: Hendrikus Jan Kapaan; Johannes Franciscus Sanden, both of Nieuwegein (NL); Jesko-Henning Tanke; Norbert Huhn, both of Schweinfurt (DE)

(73) Assignee: SKF Engineering and Research Centre B.V., Nieuwegein (NL)

( * ) Notice: Subject to any disclaimer, the term of this patent is extended or adjusted under 35 U.S.C. 154(b) by 0 days.

(21) Appl. No.: 09/462,567

(22) PCT Filed: Jul. 7, 1998

(86) PCT No.: PCT/NL98/00388

§ 371 Date: Jan. 21, 2000

§ 102(e) Date: Jan. 21, 2000

(87) PCT Pub. No.: WO99/02875

PCT Pub. Date: Jan. 21, 1999

(30) Foreign Application Priority Data

Jul. 10, 1997 (NL) .................................................. 1006545

(51) Int. Cl.[7] ............................. F16C 19/38; F16C 43/04
(52) U.S. Cl. ........................ 384/544; 384/506; 384/537; 384/585; 384/589
(58) Field of Search ................................. 384/505, 506, 384/537, 544, 559, 584, 585, 589

(56) References Cited

U.S. PATENT DOCUMENTS

| | | | |
|---|---|---|---|
| 1,464,316 | * 8/1923 | Gillespie | ............................... 384/506 |
| 3,958,847 | 5/1976 | Cain et al. . | |
| 5,144,743 | * 9/1992 | Kempas | ........................... 384/537 X |
| 5,328,275 | 7/1994 | Winn et al. . | |
| 5,775,819 | * 7/1998 | Kinney et al. | ....................... 384/544 |

FOREIGN PATENT DOCUMENTS

| | | |
|---|---|---|
| 27 32 763 A1 | 2/1979 | (DE) . |
| 36 44 270 A1 | 7/1987 | (DE) . |
| 0 591 587 A2 | 4/1994 | (EP) . |
| 0 623 481 A2 | 11/1994 | (EP) . |
| 0 687 826 A1 | 12/1995 | (EP) . |
| 1.043.814 | 11/1953 | (FR) . |
| 2 633 679 A1 | 1/1990 | (FR) . |
| WO 94/27055 | 11/1994 | (WO) . |
| WO 95/12072 | 5/1995 | (WO) . |

* cited by examiner

*Primary Examiner*—Thomas R. Hannon
(74) *Attorney, Agent, or Firm*—Oliff & Berridge, PLC

(57) ABSTRACT

A bearing assembly for a vehicle hub comprises rolling elements (9, 10) which are in rolling contact with at least one inner raceway (2) and outer raceway (1), of respectively an inner ring member and an outer ring member, one of which ring members comprises two bearing rings (3, 4) which are interconnected by means of a mounting sleeve (14) for preloading the rolling elements in axial direction between the raceways. The bearing rings (3, 4) are bonded to the sleeve (14) by means of glueing.

25 Claims, 6 Drawing Sheets

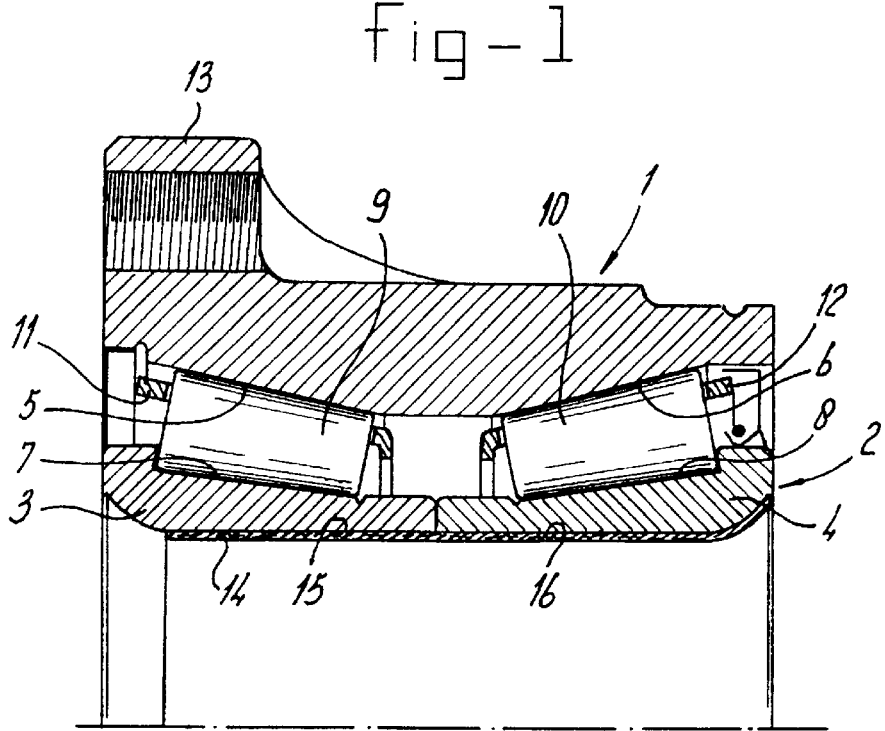
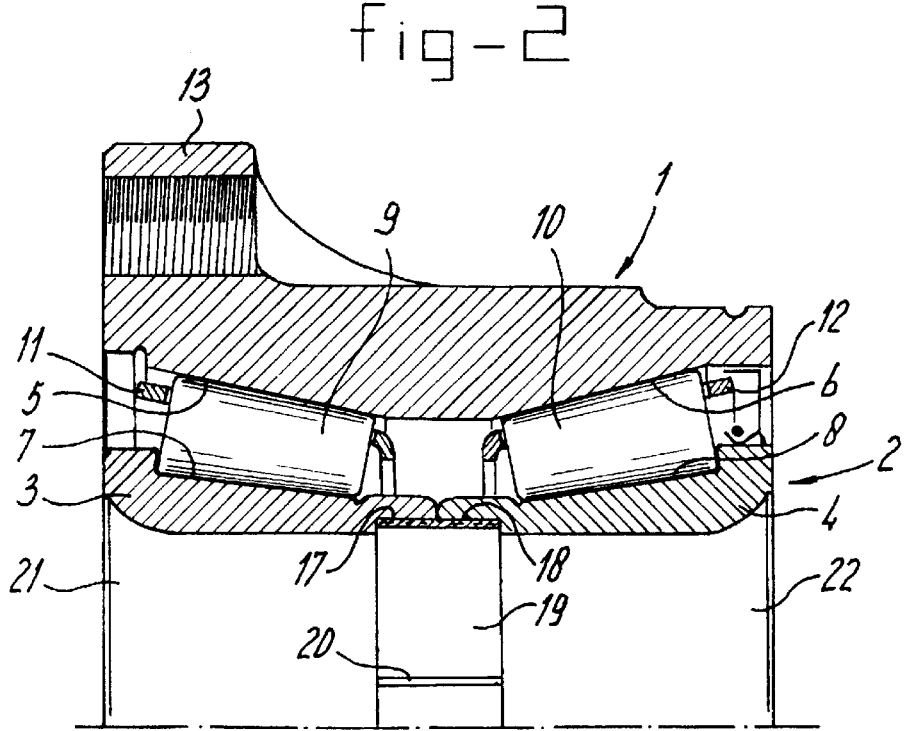

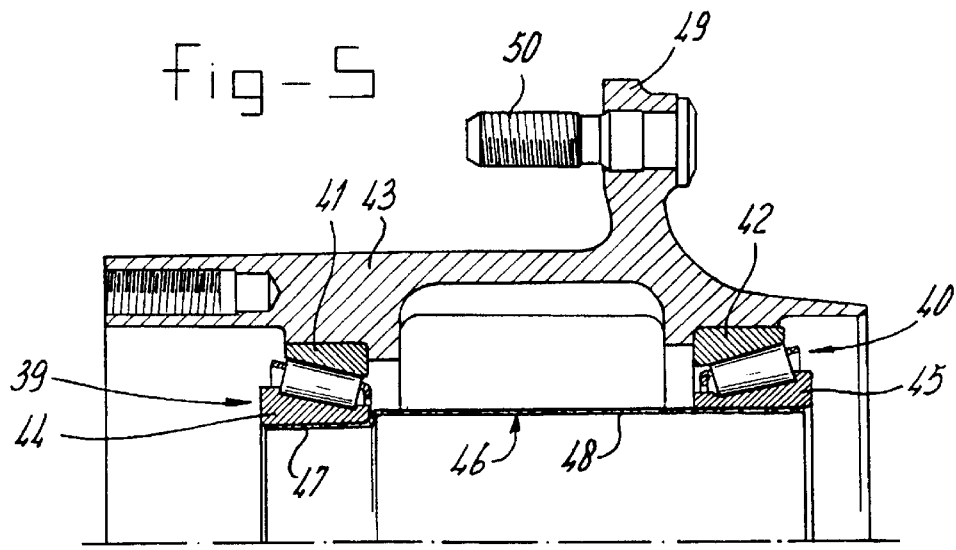
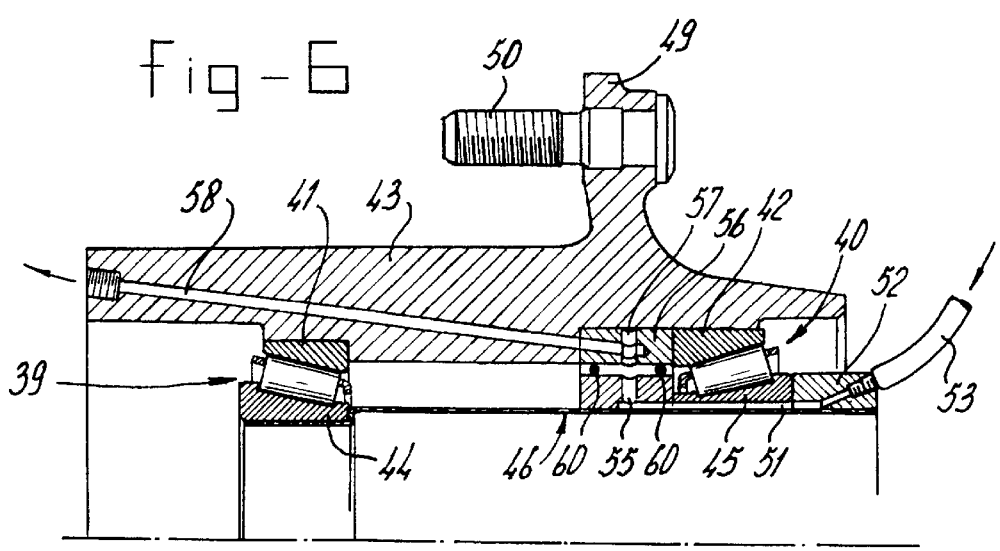
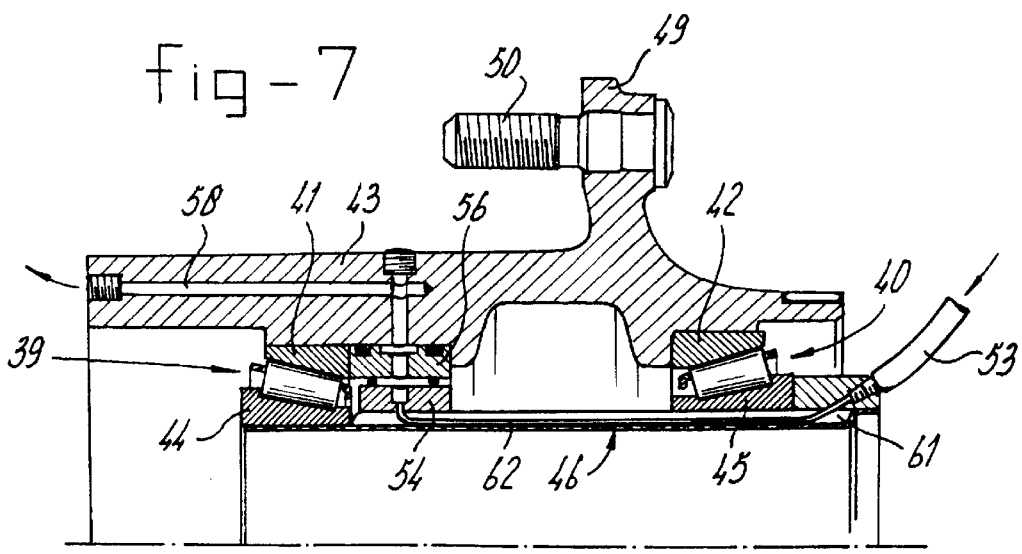

BEARING ASSEMBLY FOR A VEHICLE HUB

The invention is related to a bearing assembly for a vehicle hub, comprising rolling elements which are in rolling contact with at least one inner raceway and at least one outer raceway of respectively an inner ring member and an outer ring member, one of which ring members comprises two bearing rings which are interconnected by means of a mounting sleeve for preloading and/or positioning the rolling elements in axial direction between the raceways.

Such a bearing assembly is known from EP-A-623481. Said known assembly comprises a sleeve onto which the inner bearing rings of two taper roller bearings are mounted. The sleeve has an outer flange against which one of said inner bearing rings is resting, and an adjustable flange which is pressed against the other inner bearing ring for obtaining the desired magnitude of the preload.

The assembly constitutes a unity which can be mounted directly onto an axle stub of a vehicle. It is not necessary to apply the preload while fitting the assembly onto the axle stub, as the desired preload has already been applied at the stage of assembling the unit.

The proper preloading of the assembly depends on the accuracy of the assembling process. Also, the preload should stay constant over longer service periods, which means that the components of the assembly should be secured against coming loose.

In this respect, improvements are necessary. The object of the invention is therefore to provide a bearing assembly for a hub which can be manufactured more precisely, is more reliable as to the proper preloading, and can be mounted and dismounted more easily during service. This object is achieved in that at least one of the bearing rings is bonded to the sleeve by means of glueing.

The preload is obtained by the glued sleeve, which means that the preload can be maintained reliably during long periods. Moreover, the bearing assembly can be manufactured in a relatively simple way, without applying locking members.

The glue bond between the sleeves and the inner surfaces of the inner bearing rings is loaded in shear.

Furthermore, the glue bond between the sleeves and the inner surfaces of the inner bearing rings is of a cylindrical shape which is coaxial with respect to the axis of the bearing assembly.

The sleeve is preferably bonded to the inner surface of the inner rings. These surfaces provide a sufficiently large bonding area, which enhances the reliability of the connection of said rings.

According to a compact embodiment, the inner rings may have facing radial surfaces which rest against one another. In a first variant the inner rings may have equal inner diameters with the same wall thickness, and the sleeve has a uniform, corresponding outer diameter. In a second variant, the inner rings may have different inner diameters and the same wall thickness, and the sleeve has two sleeve parts with different, corresponding outer diameters.

Furthermore, the outer ring member may comprise a hub member having a flange for connecting a wheel thereto; the outer bearing rings may be integrated in the hub member.

The bearing assembly according to the invention has the advantage that it can be preassembled with the proper preload; also, the assembly may be pre-lubricated and subsequently the bearing space may be sealed. Thus, no dirt or other contaminant particles may enter the bearing space, ensuring an extended service life.

As the bearing assembly constitutes a complete self-contained unit, it may also be equipped with auxiliary equipment. For instance, one of the inner bearing rings may have an essentially axial groove for the supply of compressed air in a central tyre inflation system. Also, the sleeve may have a groove for the supply of compressed air in a central tyre inflation system.

According to a practical embodiment, each groove may open out in an aperture of a first supply ring connected to the sleeve, which first supply ring is opposite to and sealed with respect to a second supply ring connected to the outer ring member.

According to a further possibility, one of the inner bearing rings or the sleeve may have a groove for a signal cable connected to an ABS-sensor, the components of which are connected to the inner ring member and the outer ring member.

The inner bearing ring member may have a nipple for supplying oil to the inner surface of the sleeve, and the outer ring member may have a hole which can be brought opposite the nipple, for inserting an oil pressure line to be connected to the nipple.

According to a particular embodiment, the glue layer may be obtained from a foil. Said foil may be accommodated within a recess in at least one of the bearing rings and sleeves.

Such bearing assembly may be produced by the steps of
applying a foil of glue material in a slit between a sleeve and a bearing ring,
heating the sleeve and bearing ring so as to make the foil melt into a flowable glue,
spreading the flowable glue through the slit defined between sleeve and bearing under the influence of a reduction in the width of the slit as a result of the heat increase of sleeve and bearing ring,
cooling the sleeve and bearing ring for solidifying the glue.

Also, an expandable mandrel may be employed for compressing and spreading the glue, in case the sleeve is a split sleeve which allows expansion. The mandrel expansion may be simply obtained by heating the mandrel, which at the same time thus heats the sleeve and the foil glue so as to obtain a glue melt which spreads out through the slit between sleeve and bearing ring.

The invention will now be described further with reference to several embodiments shown in the figures.

FIGS. 1 and 2 show bearing assemblies with tapered roller bearings.

FIGS. 5–11 show further examples of bearing assemblies with tapered roller bearings.

Figure 3:
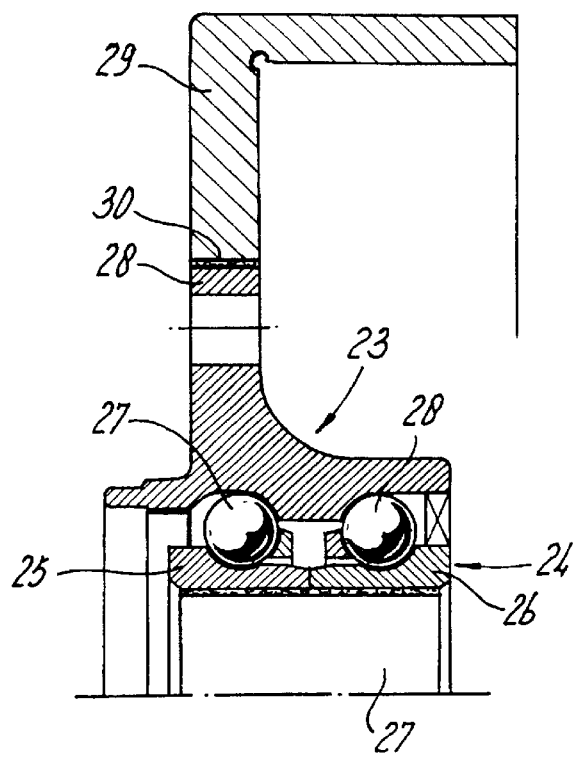
FIGS. 3 and 4 show a bearing assembly with ball bearings.

The bearing assembly as shown in FIG. 1 shows a unitary outer ring member 1, as well as an inner ring member 2 comprising two inner bearing rings 3, 4. The outer ring member has raceways 5, 6, and the inner bearing rings 3, 4 have raceways 7, 8. Between these raceways, two series of tapered rollers 9, 10 have been accommodated, each separated by a cage 11, 12. Furthermore, the outer ring 1 carries a flange 13 having holes for connecting a wheel and/or a brake thereto.

According to the invention, the inner bearing rings 3, 4 rest with their facing surfaces against one another with optimal bearing clearance. They are connected under axial preload to each other by means of the glued metallic or non-metallic sleeve 14. The sleeve 14 is glued to the inner circular surfaces 15, 16 of the inner bearing rings 3, 4, whereby a strong bond is obtained having regard to the large bonding area offered by these inner surfaces 15, 16.

In the embodiment of FIG. 2, the inner bearing rings 3, 4 each have a recess at their facing ends, defined by the recessed inner surfaces 17, 18. In these recessed surfaces 17, 18, a slit metallic sleeve 19 has been applied, which is bonded to the surfaces 17, 18. The recessed surfaces 17, 18 are at a larger diameter than the nominal surfaces 21, 22 of the bearing rings 3, 4.

The metallic sleeve 19 is applied by inward bending, and by subsequently allowing it to expand, thus forming the slit as indicated at 20. According to this embodiment, the nominal inner diameter of the bearing assembly is defined by the nominal inner surfaces 21, 22 of the inner ring 3, 4.

Although slit 20 as shown in FIG. 2 extends over the full axial length of the sleeve 19, it is also possible to provide a local slit, which does not extend over said full axial length, Moreover, it is possible to provide more than one slit, e.g. two slits each at the position of an inner bearing ring.

FIG. 3 shows a first embodiment of a bearing assembly comprising an outer ring member 23, an inner ring member 24 consisting of two inner bearing rings 25, 26, as well as two series of balls 27, 28. The inner bearing rings 24, 25 have been bonded by means of glued metallic or non-metallic sleeve 27.

The outer ring member 23 comprises a flange 28 for connecting a wheel thereto. Onto the outer circumference of flange 28, a brake drum (or brake disk) 29 has been bonded by means of glue layer 30.

Figure 4:
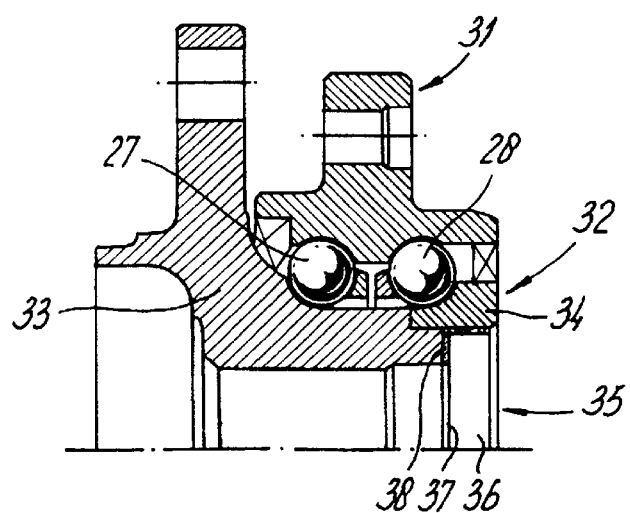

In the embodiment of FIG. 4, the bearing assembly comprises a unitary outer ring member 31, as well as an inner ring member 32 consisting of two inner rings 33 and 34. There are two series of balls 27, 28.

The inner diameter of inner ring member 4 is larger than the inner diameter of inner ring member 33. These members have been connected to each other by means of glued metallic or non-metallic sleeve 35. In particular, sleeve part 36 of sleeve 35 is glued to the inner surface of bearing ring 32, whereas flange member 37 of sleeve 35 is glued to radial surface 38 of bearing ring 33.

FIG. 5 shows a bearing assembly for a truck hub unit. This bearing assembly comprises two tapered roller bearings 39, 40, the outer rings 41, 42 of which are connected to hub member 43, and the inner rings 44, 45 of which are glued to sleeve 46. The inner diameter of ring 44 is smaller than the inner diameter of ring 45, and the sleeve 46 has corresponding sleeve parts 47, 48 of different diameters. Hub member 43 has a flange 49, carrying wheel bolts for connecting a wheel to the hub member 43.

The bearing assembly can be mounted onto the axle stub of a truck, whereby sleeve member 46 fits onto the narrowing shape of the axle stub.

In the embodiment of FIG. 6, a groove 51 has been applied in the inner ring 45. At the outer end of this groove, a nipple 52 connected to an air pressure line 53 is connected. At the inner end of the groove 51, a first supply ring 54 has been mounted, comprising a radial opening 55 in communication with groove 51.

The hub member 43 carries a second supply ring 56, having an opening 57 in communication with bore 58, to be connected to a tire to be inflated.

The supply rings 54, 56 have been sealed with respect to each other by means of seals 60.

The embodiment of FIG. 7 comprises a sleeve having an axial groove 61. This groove contains a pressure line 62, by means of which compressed air for a tire inflation system can be fed to supply rings 55, 56, and further via channel 58.

Figure 8:
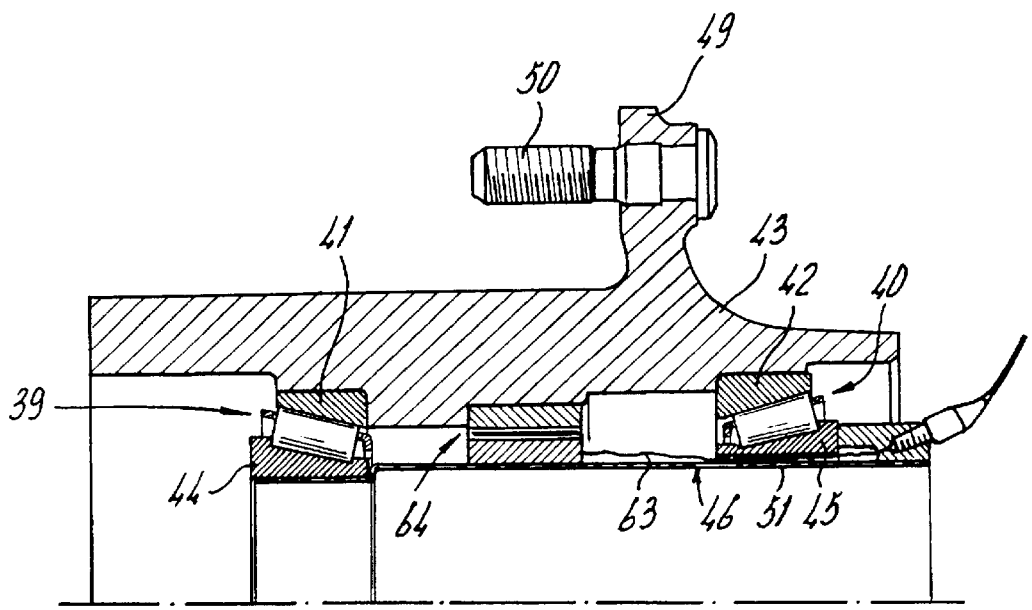

The bearing assembly according to FIG. 8 comprises a tapered roller bearing with a groove 51 in inner ring 45. Via this groove 51, an electric cable 63 for ABS sensor 64 is lead.

Figure 9:
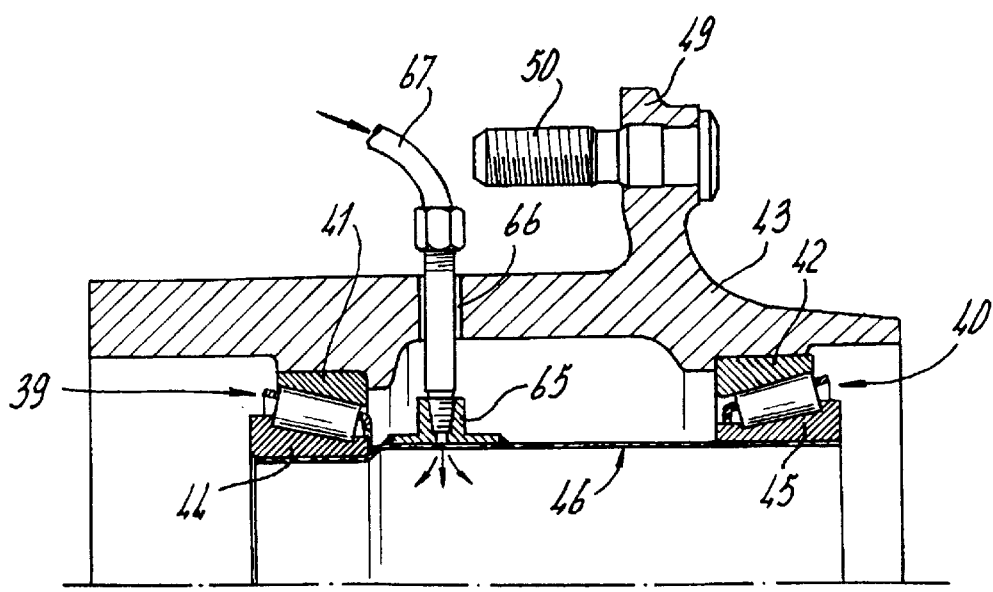

For purposes for dismounting the bearing assembly from the axle of the vehicle, the bearing assembly according to FIG. 9 has a sleeve 46 with an oil pressure nipple 65. The outer ring member 43 has a radial hole 66, which can be aligned with respect to oil pressure nipple 65 for connecting an oil pressure line 67 thereto.

Via the oil pressure line 67, oil can be pressed between the facing surfaces of sleeve 46 and the axle, such that removing the bearing assembly in question from the axle is promoted.

Although the figures are all related to bearing assemblies with two series of rolling elements, other embodiments are possible as well, e.g. with only one series of rolling elements, or more than two series.

Figure 10:
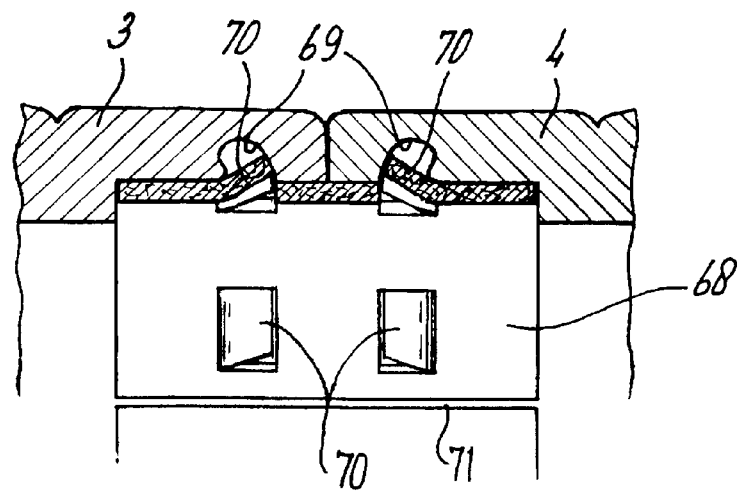

FIG. 10 shows an amended detail of the embodiment of FIG. 2. The inner bearing rings 3, 4 according to FIG. 10 have recessed surfaces 17, 18 which have an additional connection groove 69.

The metallic sleeve 68 has a slit 71 for mounting purposes and has outwardly protruding dents 70 which have been punched out of the sleeve. Opposing dents 70 grip in correspondingly opposed grooves 69, which provides a positive locking of the bearing rings 3, 4. The metallic sleeve 68 is also embedded in glue material.

Figure 11:
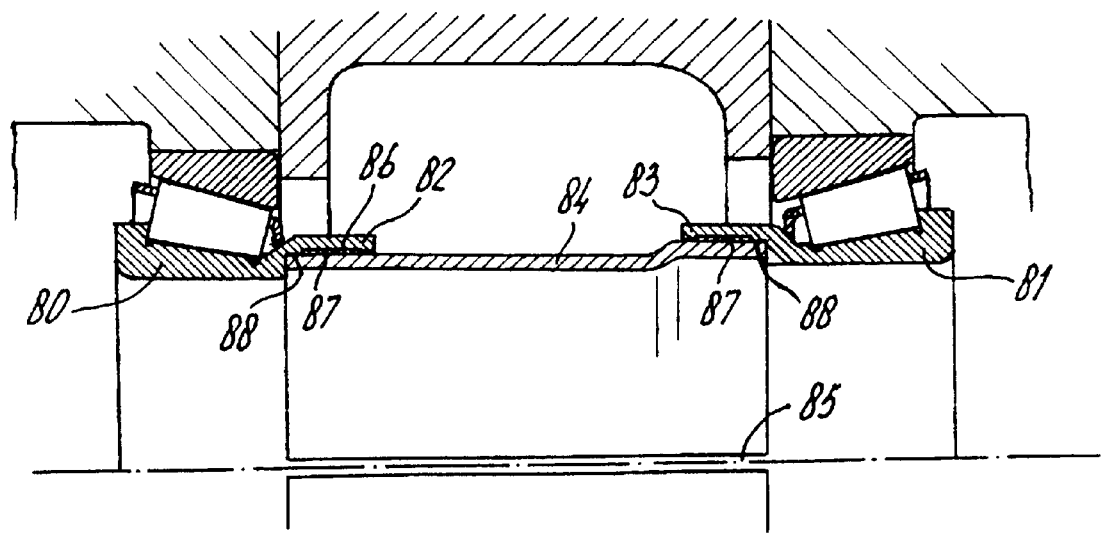

FIG. 11 shows an embodiment wherein the inner bearing rings 80, 81 each have a connecting ring 82, 83, which are mutually connected by a steel sleeve 84 having a slit 85.

Each of the connecting rings 82, 83 have a recess 86, wherein a glue foil has been accommodated. A small slit 88 is available between the connecting rings 82, 83, and the sleeve 84.

By heating the steel sleeve and using an expandable mandrel, two effects are obtained. First of all, the glue foil is heated and melts, thus providing a flowable glue which may penetrate the slit 88 under the influence of the sleeve expansion, obtained by the expandable mandrel.

Thus, a uniform and regular distribution of flowable glue over the whole slit 88 is obtained.

Subsequently, the components are cooled down, leaving the glue in place, thus ensuring a proper shear connection between the inner rings 80, 81.

Figure 12:
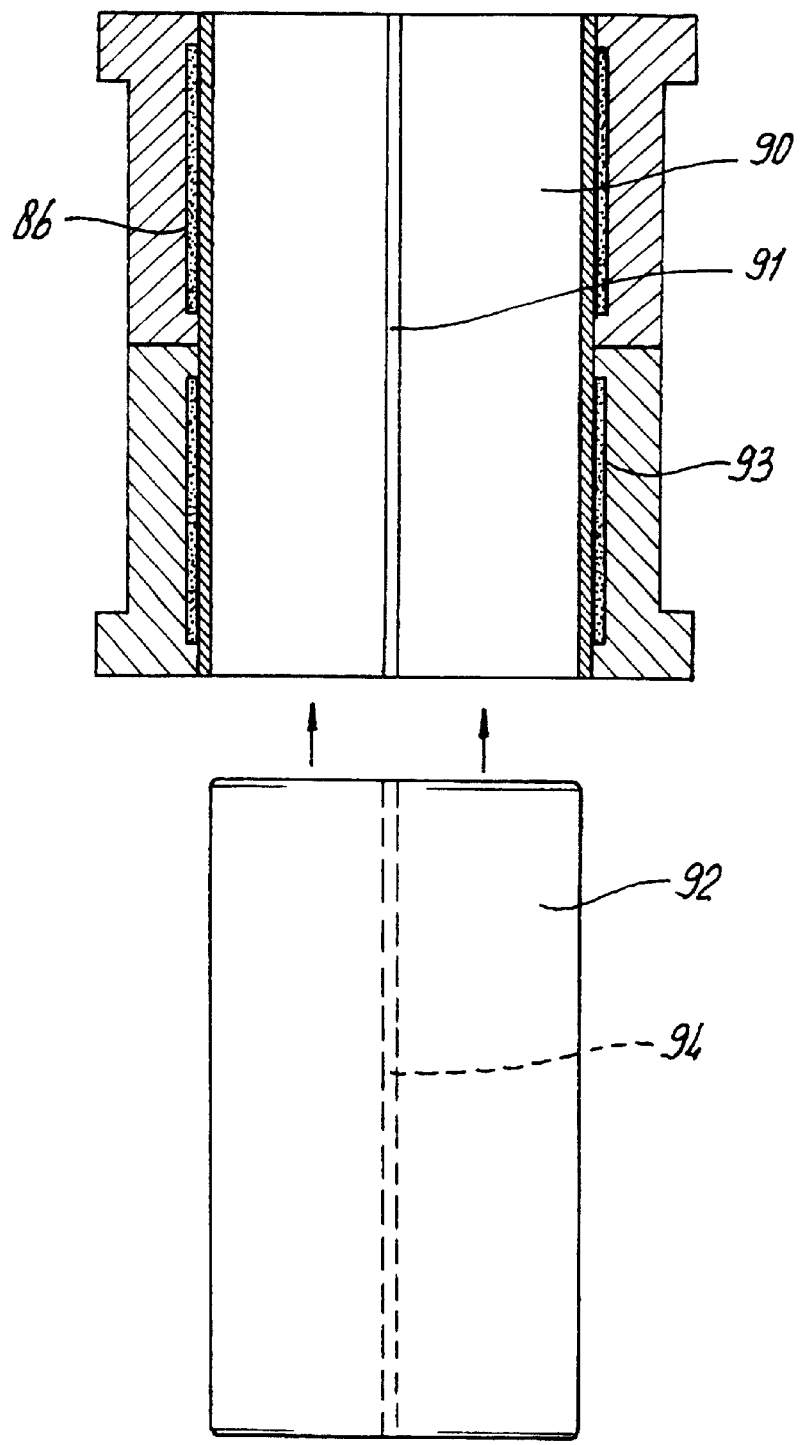
FIG. 12 shows a further embodiment with a split sleeve.

FIG. 12 shows an embodiment having a split sleeve 90. Due to the split 91, said sleeve 90 may be expanded by a heated mandrel 92, preferably of aluminum. This expansion causes the molten glue 93 to spread evenly.

The mandrel has a groove 94 situated opposite the slit 91 of the sleeve, so as to prevent glueing of said mandrel 94.

What is claimed is:

1. Bearing assembly for a vehicle hub, comprising two series of rolling elements (9, 10; 27, 28) which are in rolling contact each with a respective inner raceway (7, 8) and outer raceway (5, 6) of respectively an inner ring member (4, 24) and an outer ring member (1, 23), one of which ring members comprises two bearing rings (3, 4; 25, 26; 32, 33, 44, 45) which are interconnected by means of a mounting sleeve (14, 19, 27, 35, 46) for preloading the series of rolling elements (9, 10; 27, 28) oppositely in axial direction between the raceways (5, 8), characterized in that said bearing rings (3, 4; 25, 26; 32, 33; 44, 45) are bonded to the sleeve (14, 19, 27, 35, 46) by means of glueing, the glue bond between the sleeves (14, 19, 27, 35, 46) and the inner surfaces (15, 16, 17, 18) of the inner bearing rings (3, 4, 25, 26, 32, 33, 44, 45) being loaded in shear.

2. Bearing assembly according to claim 1, wherein the glue bond between the sleeve (14, 19, 27, 35, 46) and the inner surfaces (15, 16, 17, 18) of the inner bearing rings (3, 4, 25, 26, 32, 33, 44, 45) is of a cylindrical shape which is coaxial with respect to the axis of the bearing assembly.

3. Bearing assembly according to claim 1, wherein the sleeve (14, 19, 27, 35, 46) is bonded to the inner surfaces (15, 16; 17, 18) of the inner bearing rings (3, 4; 25, 26; 32, 33; 44, 45).

4. Bearing assembly according to claim 1, wherein the inner bearing rings (34; 25, 26, 32, 33; 44, 45) have facing radial surfaces which rest against one another.

5. Bearing assembly according to claim 1, wherein the inner bearing rings (3, 4; 25, 26) have equal inner diameters, and the sleeve (14, 19) has a uniform, corresponding outer diameter.

6. Bearing assembly according to claim 5, wherein the sleeve (19) has at least locally a slit (20).

7. Bearing assembly according to claim 1, wherein the inner bearing rings (44, 45) have different inner diameters, and the sleeve (46) has two sleeve parts with different, corresponding outer diameters.

8. Bearing assembly according to claim 1, wherein the inner bearing rings (32, 33) have different inner diameters, and the sleeve (35) has a tubular part (36) as well as a radial flange part (37), the tubular part (36) being bonded to the inner surface of the inner bearing ring (34) with relatively large inner diameter, and the flange part (37) being bonded to a radial surface (38) of the other inner ring (33).

9. Bearing assembly according to claim 1, wherein at least one of the bonding surfaces of the sleeve and/or the inner ring has been treated for better adhesion.

10. Bearing assembly according to claim 1, wherein the outer ring member comprises a hub member (1, 43) having a flange (13, 49) for connecting a wheel thereto.

11. Bearing assembly according to claim 10, wherein the outer bearing rings are integrated in the hub member (1).

12. Bearing assembly according to claim 1, wherein one of the inner bearing rings (45) has an essentially axial groove (51) for the supply of compressed air in a central tyre inflation system.

13. Bearing assembly according to claim 12, wherein each groove (51, 61) opens out in an aperture of a first supply ring (54) connected to the sleeve (64), which first supply ring (54) is opposite to and sealed (60) with respect to a second supply ring (56) connected to the outer ring member (43).

14. Bearing assembly according to claim 1, wherein the sleeve (46) has a groove (61) for the supply of compressed air of a central tyre inflation system.

15. Bearing assembly according to claim 1, wherein one of the inner bearing rings (45) or the sleeve (46) has a groove (51) for a signal cable (63) connected to an ABS-sensor (64), the components of which are connected to the inner ring member (46) and the outer ring member (43).

16. Bearing assembly according to claim 1, wherein the inner ring member (46) has a nipple (65) for supplying oil to the inner surface of the sleeve (46), and the outer ring member (43) has a hole (66) which can be brought opposite the nipple (65), for inserting an oil pressure line (67) to be connected to the nipple (65).

17. Bearing assembly according to claim 1, wherein the glue is a liquid glue.

18. Bearing assembly according to claim 17, wherein the glue bond is obtained under elevated temperature and/or pressure.

19. Bearing assembly according to claim 1, wherein the glue is a thixotropic glue.

20. Bearing assembly according to claim 1, wherein the sleeve consists of a metal.

21. Bearing assembly according to claim 1, wherein the sleeve consists of a non-metal.

22. Bearing assembly according to claim 1, wherein the sleeve (68) is provided with locking means (70) which are interlocked in grooves (69) of the bearing ring (3, 4).

23. Bearing assembly according to claim 1, wherein the glue is obtained from a foil.

24. Bearing according to claim 23, wherein the foil is accommodated within a recess in at least one of the bearing rings (3, 4; 25, 26; 32, 33; 44, 45) and sleeves (14, 19, 27, 35, 46).

25. Method for producing a bearing assembly according to claim 23, comprising the steps of applying a foil of glue material in a slit between a sleeve and a bearing ring, heating the sleeve and bearing ring so as to make the foil melt into a flowable glue, spreading the flowable glue through the slit defined between sleeve and bearing under the influence of a reduction in the width of the slit as a result of the heat increase of sleeve and bearing ring, cooling the sleeve and bearing ring for solidifying the glue.

* * * * *